United States Patent [19]
Stone

[11] Patent Number: 5,667,908
[45] Date of Patent: Sep. 16, 1997

[54] PEDESTAL AND CELL TRAY ASSEMBLY FOR LEAD-ACID CELLS AND BATTERIES

[75] Inventor: Bradley W. Stone, Elgin, Ill.

[73] Assignee: GNB Technologies, Inc., Lombard, Ill.

[21] Appl. No.: 693,558

[22] Filed: Aug. 7, 1996

Related U.S. Application Data

[63] Continuation of Ser. No. 592,014, Jan. 26, 1996, abandoned.

[51] Int. Cl.$^6$ ...................................................... H01M 2/10
[52] U.S. Cl. .......................... 429/96; 429/100; 108/150
[58] Field of Search ........................... 429/99, 96, 100, 429/186; 180/68.5; 108/150, 156, 191, 192; 211/126, 133; 248/126–128, 346.01

[56] References Cited

U.S. PATENT DOCUMENTS

| | | | |
|---|---|---|---|
| 1,958,834 | 5/1934 | Moore | 108/191 X |
| 2,939,901 | 6/1960 | Schultz | 429/100 |
| 3,081,054 | 3/1963 | Westervelt | 248/127 X |
| 4,078,757 | 3/1978 | Waters | 108/150 X |
| 5,140,744 | 8/1992 | Miller | 429/96 X |
| 5,149,603 | 9/1992 | Fleming et al. | 429/98 |
| 5,383,635 | 1/1995 | Barone | 108/150 |
| 5,390,754 | 2/1995 | Masuyama et al. | 429/100 X |
| 5,403,679 | 4/1995 | Stone | 429/99 |

*Primary Examiner*—Anthony Skapars
*Attorney, Agent, or Firm*—Leydig, Voit & Mayer, Ltd.

[57] ABSTRACT

A pedestal and cell or battery tray assembly for lead-acid cells and batteries comprises a tray of an electrically conductive material housing a plurality of the cells or batteries and a plurality of composite pedestals that support the tray and are attached thereto, each of the pedestals comprises a bottom plate of an electrically nonconductive material, an upstanding member which is attached to, and spaces the tray from, the bottom plate, an attachment means for attaching a pedestal to the tray, the pedestals electrically insulating the lead-acid cells or batteries from ground and being capable of being configured to satisfy the requirements for seismic conditions.

11 Claims, 4 Drawing Sheets

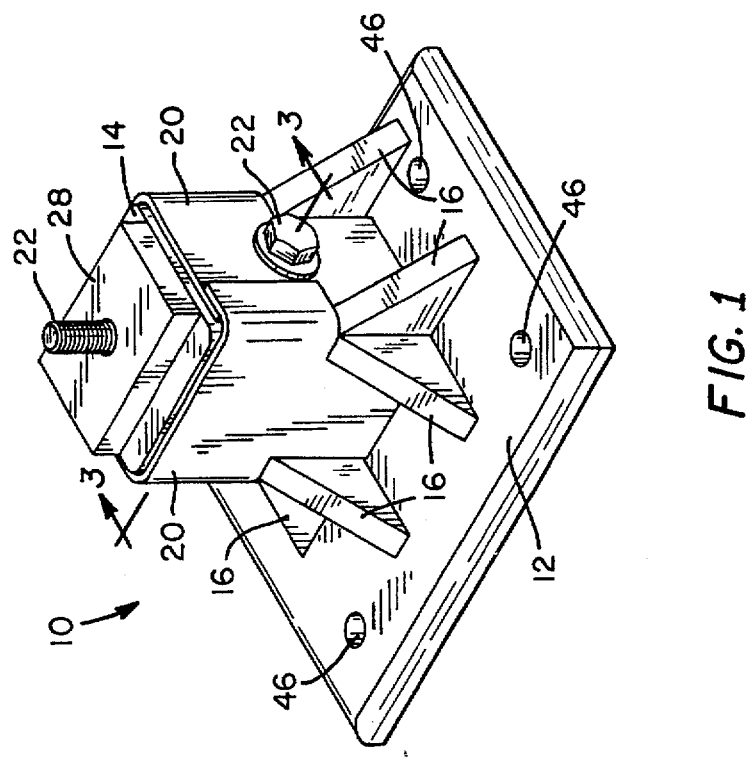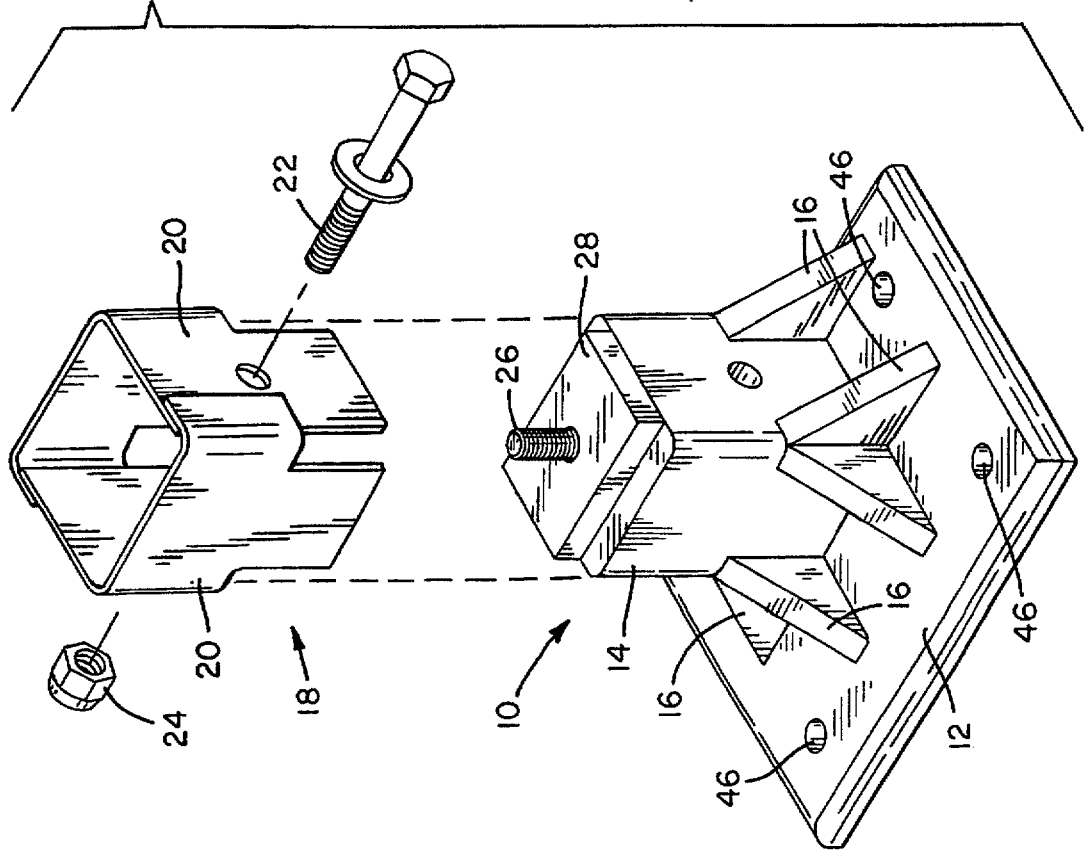

PEDESTAL AND CELL TRAY ASSEMBLY FOR LEAD-ACID CELLS AND BATTERIES

This is a continuation of application Ser. No. 08/592,014 filed on Jan. 26, 1996, now abandoned.

BACKGROUND OF THE INVENTION

1. Field of the Invention

This invention relates to lead-acid cells and batteries, and, more particularly, to a pedestal and cell tray assembly for housing such cells and batteries.

2. Description of the Prior Art

Stationary batteries are specifically designed for float applications, that is, as standby power in the event of a power failure. Stationary batteries are usually maintained at a full-state-of-charge and in a ready-to-use condition typically by floating at a constant preset voltage. Standby batteries are used for standby or operational power in the communications field, utilities, for emergency lighting in commercial buildings and uninterruptible power supplies.

Uninterruptible power supplies are systems that back-up computers and communication networks. Sealed lead-acid cells and/or batteries may comprise the power source. The uninterruptible power source allows for the orderly shut down of computers when there is a sudden interruption in the primary electrical source, such as during a power outage and provides back-up power for communications networks. The uninterruptible power supply also will accommodate short, or intermittent, losses in power. When there is a power interruption, the batteries in the uninterruptible power system can be subject to rapid discharge.

The sealed lead-acid stationary cells and/or batteries used for industrial applications where the power requirements are high and quite demanding are typically comprised of from several to a large number of individual sealed lead-acid cells connected to one another to form a battery with the desired capacity and power requirements. The individual sealed lead-acid cells may be connected in series, in parallel or in suitable combinations of series and parallel to form a battery with the desired capacity and power requirements. External connections are typically made between the negative and positive terminal posts of the respective cells.

The weight of lead-acid cells used for such high rate applications can vary considerably. However, each individual cell may, for example, weigh from about 30 to 60 pounds or more.

Because of space considerations, these large capacity cells need to be placed on racks, cabinets or the like in an attempt to minimize the space requirements. Height limitations in some locations also present a problem for providing racks for the number of cells required, given the available floor space. A complicating factor is that, due to the weight of the cells, the cell rack or cabinet must be extremely sturdy in construction and stable in use. Still further, for Zone 4 applications, i.e., locations where high seismic conditions can occur, there are even further stringent requirements that must be met to insure that the cells are adequately secured in the racks should such high seismic conditions occur.

To satisfy these diverse requirements, the cell tray racks and trays currently being used, insofar as it can be ascertained, all utilize metal base supports. While such supports adequately accommodate the weight of the cells and may perhaps satisfy the stringent requirements of UBC Zone 4 applications (i.e., satisfy the requirements that the cells are adequately secured under defined high seismic conditions), there are substantial disadvantages. Such metal base supports allow essentially no flexibility in the case of an uneven mounting surface, often the floor of a building, since the support typically will not bend enough to follow the contour of an uneven mounting surface. Further, to satisfy the load and seismic requirements, such metal supports have been both relatively heavy as well as being costly, often being made of relatively expensive metals such as steel.

Additionally, and importantly, such metal base supports do not provide any electrical insulation from ground in the event of the short circuiting of the cell tray system being accommodated in the rack or tray. This is particularly significant in applications requiring relatively high voltages. Accordingly, this important safety feature has been either ignored in such existing metal base supports and racks or supplemental means have been utilized in an attempt to satisfactorily provide electrical insulation from ground. Such solutions tend to be complicated and the overall cost considerations are often relatively expensive.

The pedestal or base supports in use likewise pose inventory and manufacturing complications. Thus, insofar as applicant is aware, the pedestals in use lack universality. It is therefore the case that different sized cells or batteries have used racks with different pedestals.

It is accordingly a principal object of the present invention to provide a pedestal support and tray assembly capable of housing cells and/or batteries used for standby applications which minimizes, if not eliminates, short circuit problems by providing an electrical insulation from ground while satisfying the diverse requirements required for accommodating cells and batteries for standby applications.

A further object is to provide a pedestal and tray assembly which is cost-effective and which can be readily manufactured.

Another object of the present invention lies in the provision of such a system which satisfies the requirements for use in high seismic areas, specifically UBC Zone 4 applications.

Yet another object of the present invention provides pedestals that can be readily attached and removed from a cell tray assembly so as to provide enhanced flexibility in use and may be used with a wide variety of cells and batteries.

These and other objects and advantages of the present invention will be apparent from the following descriptions and drawings. While the present invention may be used with any batteries or cells that satisfy the requirements of the particular application, it will be described herein in conjunction with sealed lead-acid cells (often termed "VRLA" cells, i.e., valve-regulated lead-acid).

SUMMARY OF THE INVENTION

In accordance with the present invention, there is provided a pedestal and cell tray assembly which comprises at least one cell tray assembly configured to house the number and size of cells required for the particular application which can be made of metal such as steel or any other material, as is desired. In accordance with the present invention, it has been found that the various requirements, including those for high seismic conditions, can be satisfied by utilizing a composite pedestal which achieves, upon assembly with the desired cell trays, electrical insulation from ground. It has thus been found that suitable pedestals can be provided for such cell tray assemblies by providing a bottom plate of a nonconductive material and an upstanding member attached to the bottom plate and spaced therefrom so that the cell tray or trays are elevated above the ground or other surface upon which the cell tray assembly is mounted. It has been found that a combination of a nonconductive material such as, for example, an engineering plastic and higher strength metals can satisfy the necessary strength and other criteria so long as the composite pedestal is properly configured.

In this fashion, a cost-effective pedestal can be provided which can be readily and removably attached to the cell tray assembly or assemblies needed to satisfy the use requirements for a particular application. Yet, the pedestals may be readily removed if desired, so as to provide highly versatile use in service.

BRIEF DESCRIPTION OF THE DRAWINGS

FIG. 1 is a perspective view of one embodiment of a pedestal for use in the assembly of the present invention;

FIG. 2 is an exploded perspective view of the embodiment of the pedestal shown in FIG. 1 and showing the various components;

DETAILED DESCRIPTION OF THE INVENTION

Figure 3:
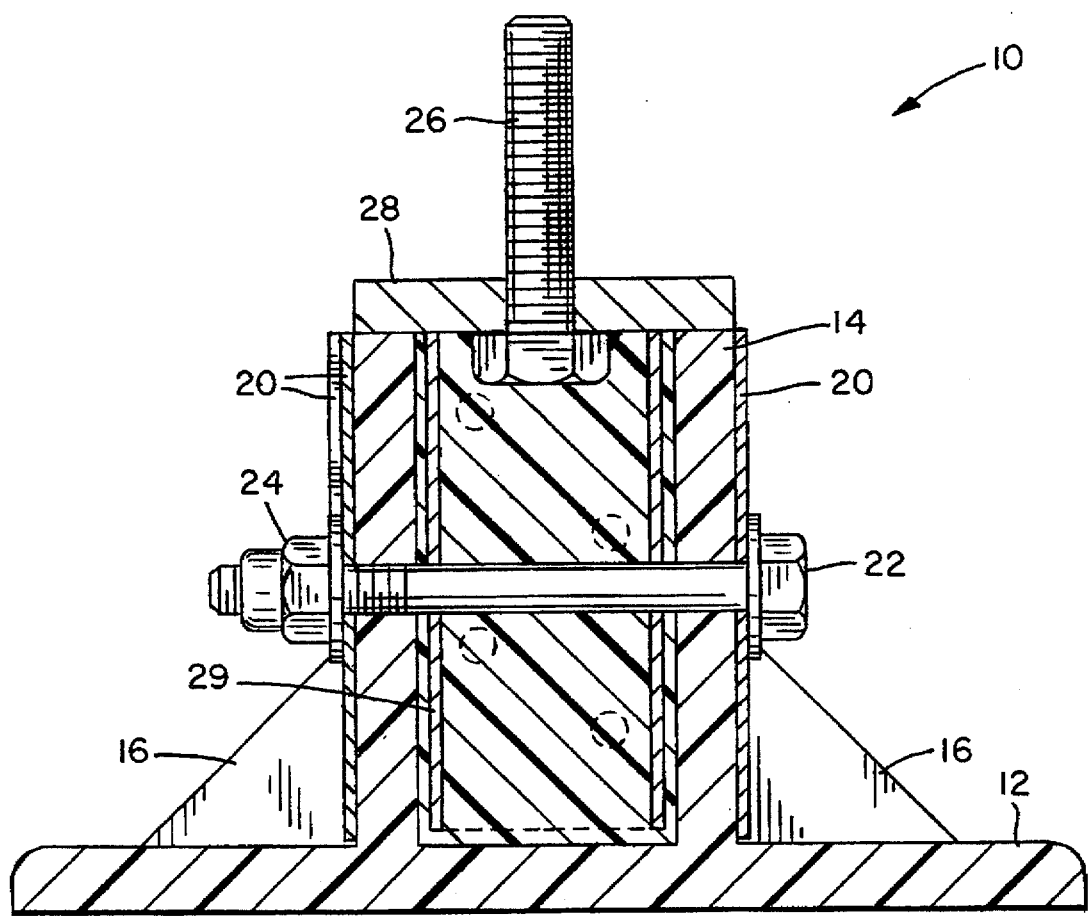
FIG. 3 is a cross-sectional view taken generally along line 3—3 of FIG. 1 and showing the internal configuration of the pedestal embodiment of FIGS. 1 and 2.

FIGS. 1–3 illustrate one preferred embodiment of a pedestal for use in the cell rack assembly of the present invention. The pedestal 10 thus comprises a nonconductive bottom plate or base 12 and an upstanding member 14 attached to base plate 12 which serves to space the cells from the floor or other surface on which the cell tray assembly is mounted in use. Preferably, the upstanding member 14 is molded integrally with the nonconductive bottom plate or base 12. Optionally, and preferably, further support between the upstanding member 14 and bottom plate 12 to impart enhanced structural rigidity to the overall pedestal is achieved by a plurality of supports 16. It has been found suitable to utilize integrally molded supports 16 in the configuration and location shown in FIGS. 1 and 2. However, consistent with the objectives of this invention, any other location and shape may be used which satisfies the criteria discussed herein.

To supplement the overall strength and structural rigidity of the pedestal 10, a sheath 18 is provided. Thus, as shown in FIGS. 1 and 2, sheath 18 comprises sleeves 20 that interlock with each other and are configured so as to be capable of being slid into place as shown in FIGS. 1 and 2 about the upstanding member 14. In the preferred embodiment shown, the sleeves 20 are configured to fit between supports 16 and to otherwise encase the upstanding support member 14.

So as to allow the forces to be distributed throughout the composite pedestal 10, the sheath 18 must be suitably attached to upstanding member 14. To this end, and as is shown in FIGS. 1–3, suitable attachment can be provided by a bolt 22 and nut 24 with the bolt 22 extending (as best seen in FIG. 3) from one side of the sheath 18 to the other side. Any other means of attachment which achieves the desired objectives can be used; however, the illustrative embodiment provides a straightforward, but effective, means.

The means of attachment of the pedestals to the cell trays to form the assembly of the present invention should ensure that the forces imparted to the pedestal are satisfactorily transmitted throughout the composite pedestal structure. To this end, and in accordance with the preferred embodiment, this is achieved as shown in FIGS. 1–3 by a bolt 26 attached (for example, by welding) to a force-transmitting plate 28. In this fashion, the forces are transmitted from the bolt 26 to plate 28 and, ultimately, to the composite pedestal 10 itself.

Indeed, in the preferred embodiment of the present invention, the strength of the composite pedestal 10 is enhanced by attaching the force-transmitting plate 28 to a metal tube 29 (as shown in FIG. 3), as by welding. The bolt 22 and nut attachment of sheath 18 to upstanding member 14 likewise connects together metal tube 29 with these other components, providing a composite pedestal which functions as an integral unit.

The plastic or, more generally, nonconductive portion of pedestal 10 may be fabricated by any method desired and utilize any plastic or other nonconductive material which provides satisfactory structural rigidity and support in use with the cell trays employed to satisfy high seismic conditions and the other structural requirements of the particular application. As illustrative examples, suitable plastic materials which can be utilized include polyolefins such as polypropylene, polyvinyl chlorides, polycarbonates, and the like. Increased strength can be achieved by using any desired filler, many of which are known. As one example, it has been found desirable to include glass strands at a loading of about 30 to 40 percent by volume. As regards nonconductive materials other than plastics, illustrative examples include fiberglass and the like.

The plastic or nonconductive component of composite pedestal 10 can be made by any method desired. It has been found suitable to use injection molding, and conventional injection molding techniques can accommodate the metal tube assembly comprising bolt 26, force-transmitting plate 28 and metal tube 29. More particularly, the plastic components can be molded about this metal tube assembly resulting in the assembly being molded into the plastic.

To contribute to the yield strength and structural integrity of the composite pedestal of the present invention, any materials can be used to make the sheath 18, the force-transmitting plate 28 and the metal tube 29. Illustrative examples include steel (both carbon and stainless), tin, brass and copper.

The dimensions of the various components comprising the composite pedestal of the present invention can be varied as desired, based upon the requirements for the particular application and the materials of choice. As one illustrative example, it has been found suitable to utilize a sheath 18 of thirteen gauge sheet steel (hot or cold-rolled) and seven gauge sheet steel for metal tube 29 with the outside dimension of metal tube 29 being about 5/16" from the exterior of upstanding member 14.

Pursuant to the present invention, it has been found that the force-transmitting plate 28 is the highest stress point in the system. Accordingly, to allow the forces to be transmitted without the plate itself failing in use, the force-transmitting plate 28 should be appropriately configured, and it has been found satisfactory to utilize 1040 carbon steel about one-half inch in thickness.

The height of the cells should be at least about four inches above the floor or other mounting surface to comply with IEEE requirements. Base plate 12 can have, for example, a thickness of about ½ inch, and the height of upstanding member 14 is then such as to provide the desired elevation above ground for the cells.

In comparison to existing metal pedestal and cell tray assemblies, it has been found that the use of the present invention can achieve improved structural rigidity. Thus, the resulting structure can be stiffer than previously used steel structures; and the increased structural rigidity and greater stiffness can translate to increased resistance to bending forces, such as might occur in high seismic conditions.

Figure 4:
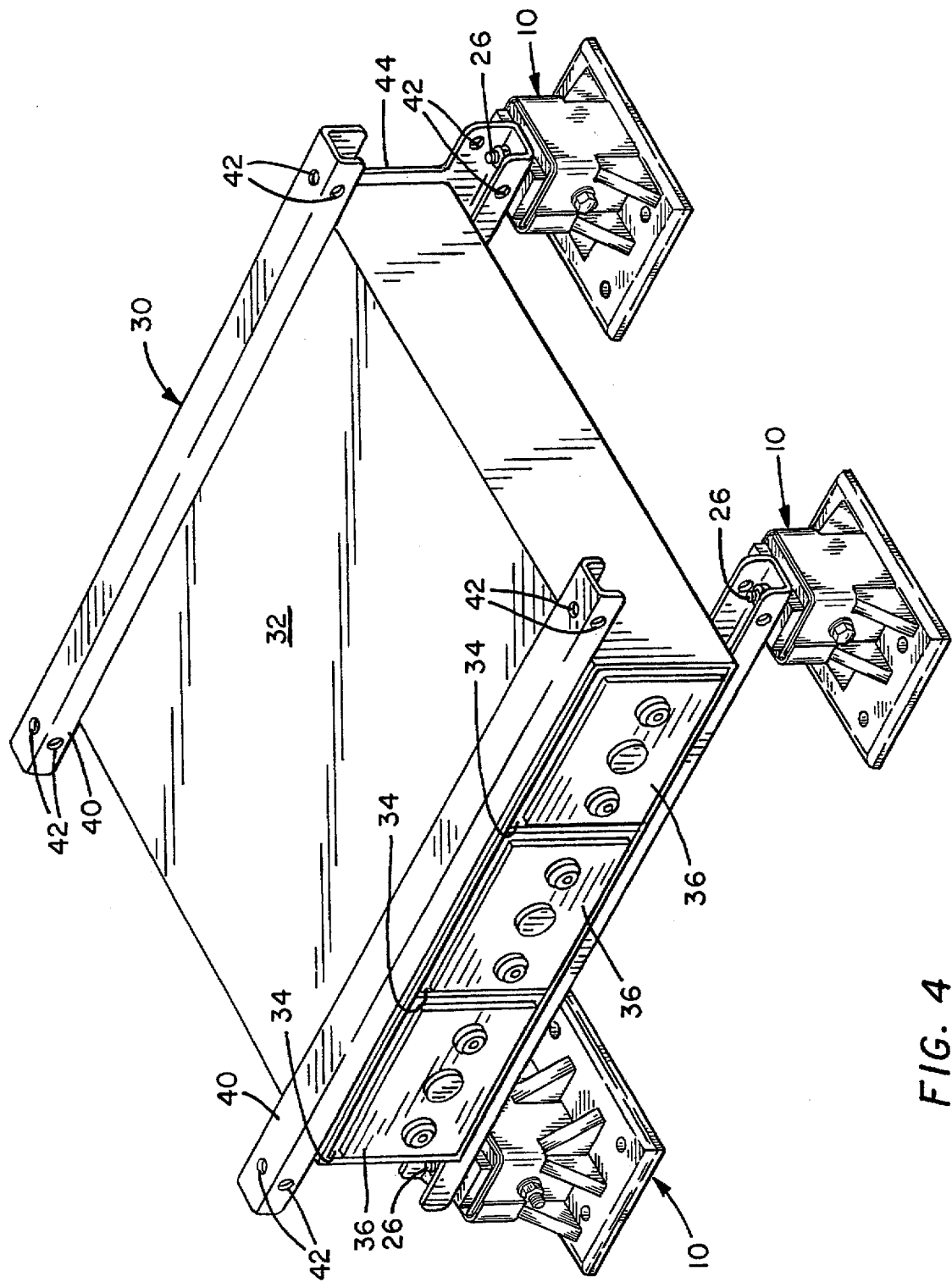
FIG. 4 is a perspective view of the pedestal and cell tray assembly of the present invention showing the cells in position in the cell tray.

The pedestals that form a part of the present invention can be used with any configuration of tray assembly. The principal requirement is that the bolt or other attachment means is compatible with the cell tray assembly itself. FIG. 4 shows one embodiment of a conventional cell tray mounted using the pedestals shown in FIGS. 1-3. As is thus shown in FIG. 4, the cell tray assembly 30 comprises a cell tray 32 having cell-receiving receptacles 34 in which cells 36 are positioned. The cells 36 may be held in position within the cell-receiving receptacles 34 by any suitable means not shown, one example being a fabricated steel angle or bar, as is known. Any such structure used can combine with the sizing of the receptacles 34 to prevent movement of the cells within. More particularly, cell partitions 38 may be positioned to fit the size of the cell needed for the particular application.

While any suitable means of attachment of the pedestals to the cell tray used, it has been found satisfactory to utilize the steel channels 40 attached to the conventional cell tray 32 by any means desired such as welding, riveting, bolting or the like. The channels 40 provide adequate rigidity for the cell tray assembly 30 itself. In addition, apertures 42 can be provided in channels 40 to achieve satisfactory attachment of the pedestal 10 to the cell tray assembly 30, and connecting support 44 can be used to provide support and to close one end of the cell compartment.

The composite pedestals of the present invention provide what may be considered to be a universal pedestal. More particularly, regardless of the size of the cell trays utilized, only one embodiment of pedestals may be used which will accommodate all sizes of the cell trays needed for a particular application.

To assemble the pedestals and tray assembly in the field, the bottom plate 12 can be provided with apertures 46 spaced so that the overall assembly may be suitably bolted to the floor or other mounting surface. Any other attachment means desired can be used, as well.

The structure of the cell tray assembly used does not itself form a part of the present invention. Rather, the present invention is directed to the novel composite pedestals and to a combination of such novel composite pedestals with any compatible cell tray assembly. Many suitable cell or battery trays are known and may be used. The cell tray shown in FIG. 4 represents one known cell tray that has been found to be useful in combination with the novel pedestals described herein.

The composite pedestal embodiment shown in FIGS. 1-3 is considered preferable in many respects. Thus, enhanced structural rigidity in comparison to previous metal supports can be provided by this composite embodiment as well as the other advantages previously discussed herein. However, the plastic mold required does represent a significant capital cost.

Accordingly, while not achieving all of the functional objectives that may be obtained with the composite pedestals of the present invention shown in FIGS. 1-4, another composite pedestal embodiment can be utilized that will achieve many of the objectives, yet not require as significant a capital cost as the initial preferred embodiment. To this end, FIGS. 5 and 6 illustrate a further embodiment of a composite pedestal 50 that may be used in the present invention.

Figure 5:
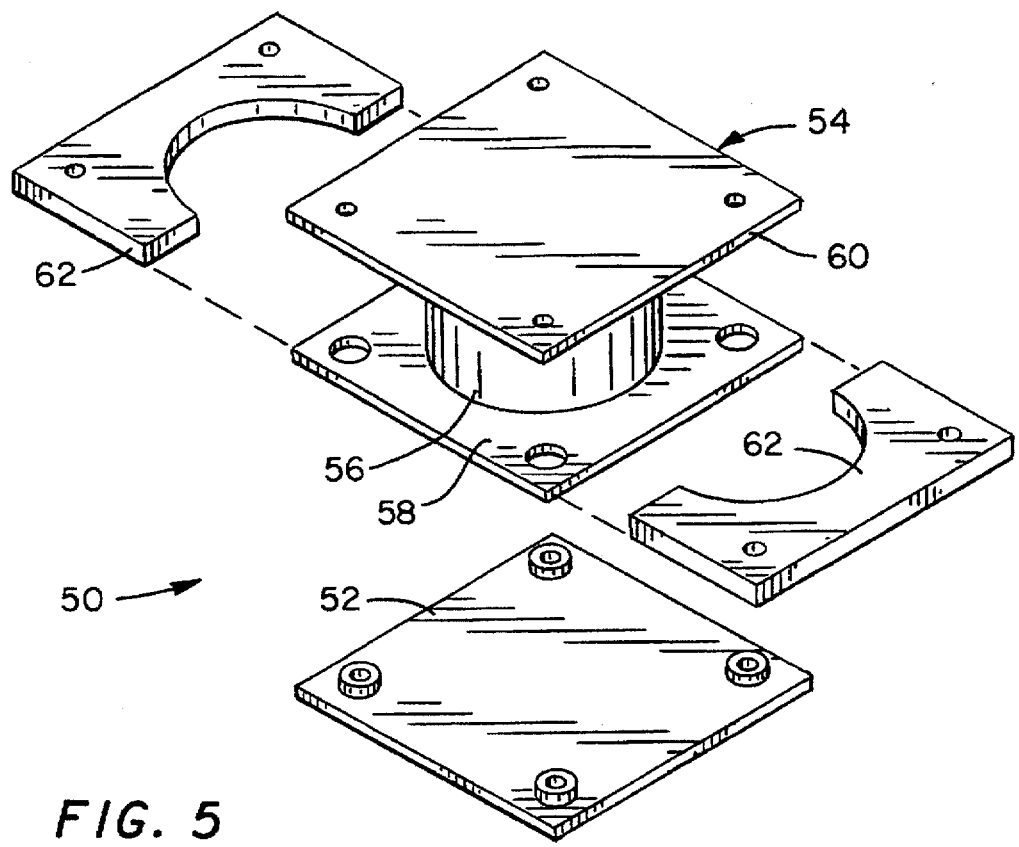
FIG. 5 is an exploded perspective of another embodiment of a pedestal of the present invention.
Figure 6:
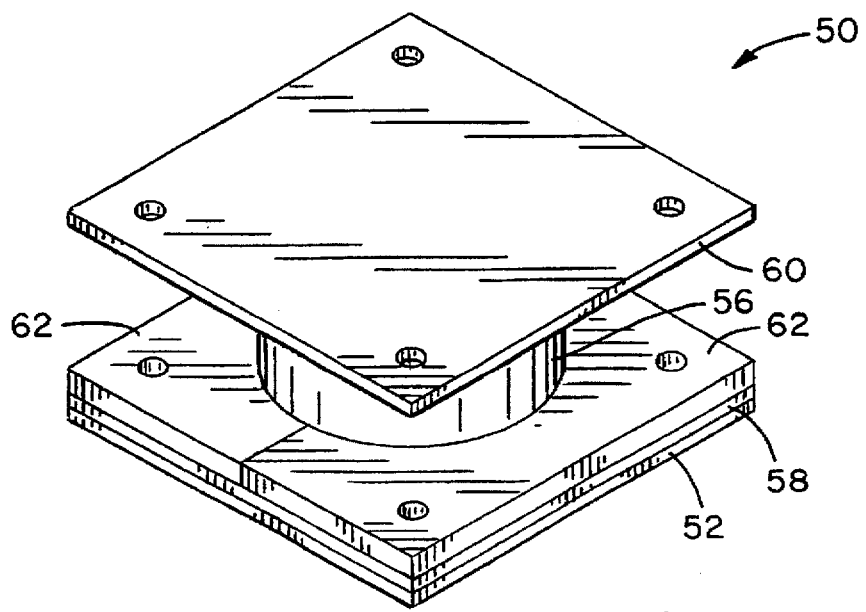
FIG. 6 is a perspective view of the pedestal embodiment of FIG. 5 shown in its assembled condition.

As is shown in FIGS. 5 and 6, the composite pedestal 50 comprises a molded plastic or nonconductive material bottom plate 52 to which is attached a steel pedestal 54 comprising upstanding member 56 and bottom and top steel pedestal plates 58 and 60. Bottom steel pedestal plate 58 sets on nonconductive bottom plate 52 and has a molded plastic or nonconductive top plate 62 formed of complemental parts which fit around upstanding steel pedestal member 56. Preferably, in this embodiment, one or both of the insulating bottom and top plates 52 and 62 are provided with lips so as to encase bottom steel plate 58 within, thereby ensuring insulation from ground. In this embodiment (as best seen in FIG. 6), each of the molded bottom and top plastic plates 52 and 62 are provided with peripheral lips so that the steel pedestal bottom plate 58 is not visible in FIG. 6, being encased by such peripheral lips. Heat sealing or the like may be used, if desired, to mold top plate 52 and bottom plate 62 together. Attachment to the cell tray used (for example, the cell tray 30 shown in FIG. 4) can be achieved using apertures 64 in top plate 60 and then bolting or otherwise attaching the pedestal to the cell tray assembly.

While the embodiment of FIGS. 5 and 6 satisfies the requirements for high seismic conditions and provides satisfactory electrical insulation from ground and can be a cost-effective solution for many applications, the embodiment of FIGS. 5 and 6 will achieve the structural rigidity essentially provided by metal pedestal 54. Accordingly, this embodiment will typically not achieve the enhanced structural rigidity capable of being achieved by the composite pedestal illustrated in the embodiments of FIGS. 1-3.

Thus, as has been seen, the present invention provides a pedestal and cell tray assembly that can be used to advantageously be utilized for a variety of stationary power applications. Considerable versatility can be achieved with only one configuration of pedestals required for all sizes of commercially sized sealed lead-acid cells. The electrical insulation from ground is particularly desirable for stationary applications in which the use requirements involve relatively high voltages. However, the advantages of the present invention will find utility in virtually any stationary cell or battery application. Still further, while the present invention is desirably used with VRLA cells, it should be appreciated that the invention is equally applicable to use with conventional lead-acid cells such as are used in some stationary battery applications, as well as with batteries using electrochemical systems other than lead-acid.

I claim:

1. A pedestal and cell or battery tray assembly comprising:
    at least one tray of an electrically conductive material housing a plurality of lead-acid cells or batteries, and
    a plurality of composite pedestals supporting said tray and attached thereto, each of said pedestals comprising a bottom plate of an electrically nonconductive material, an upstanding member attached to, and spacing said tray from, said bottom plate, said upstanding member being at least partially of an electrically conductive material, and attachment means for attaching a pedestal to said tray, said pedestals electrically insulating the lead-acid cells or batteries from ground.

2. The pedestal and cell or battery tray assembly of claim 1, wherein said bottom plate and upstanding member comprise an integrally molded plastic.

3. The pedestal and cell or battery tray assembly of claim 2, wherein said plastic comprises a filled polypropylene.

4. The pedestal and cell or battery tray assembly of claim 3, wherein the polypropylene is filled with glass.

5. The pedestal and cell or battery tray assembly of claim 2, wherein the composite pedestals include a metallic sheath surrounding the plastic upstanding member and said tray rests upon a force-transmitting plate which transmits the forces from the cell tray throughout the composite pedestal.

6. The pedestal and cell or battery tray assembly of claim 5, which includes a bolt attached to said force-transmitting plate.

7. The pedestal and cell or battery tray assembly of claim 6, wherein said bolt is welded to said force-transmitting plate.

8. The pedestal and cell or battery tray assembly of claim 6, which includes a metal tube embedded within the plastic upstanding member and attached to said force-transmitting plate.

9. The pedestal and cell or battery tray assembly of claim 8, which includes attachment means connecting together said sheath and said metal tube.

10. The pedestal and cell or battery tray assembly of claim 9, wherein the attachment means connecting the sheath and metal tube together is a bolt.

11. The pedestal and cell or battery tray assembly of claim 1, wherein said upstanding member includes a metal member having top and bottom surfaces connected by a spacing member, the top surface being attached to said cell tray and the bottom surface being attached to said bottom plate, and an electrically nonconductive covering member located on top of the bottom surface of said metal member, and at least and said bottom surface covering member and said bottom plate having lips encasing the periphery of the bottom surface of said metal member.

* * * * *